E. J. WILSON.
ROTARY SPEED INDICATOR.
APPLICATION FILED DEC. 21, 1916.
1,416,082.
Patented May 16, 1922.
7 SHEETS—SHEET 1.
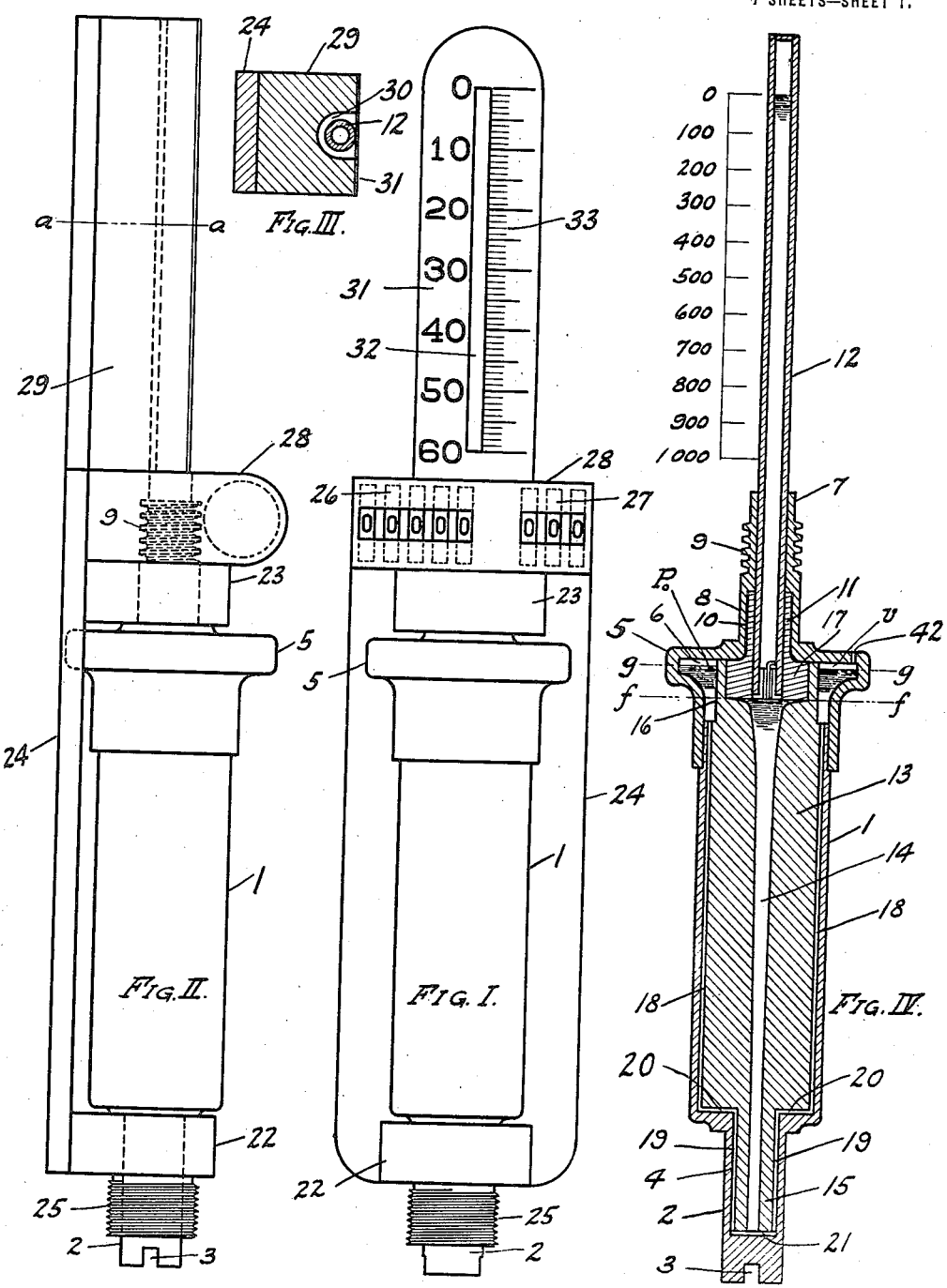
WITNESSES:—
Robert J. Thomas
J. Wertheim
INVENTOR:
Emery J. Wilson.

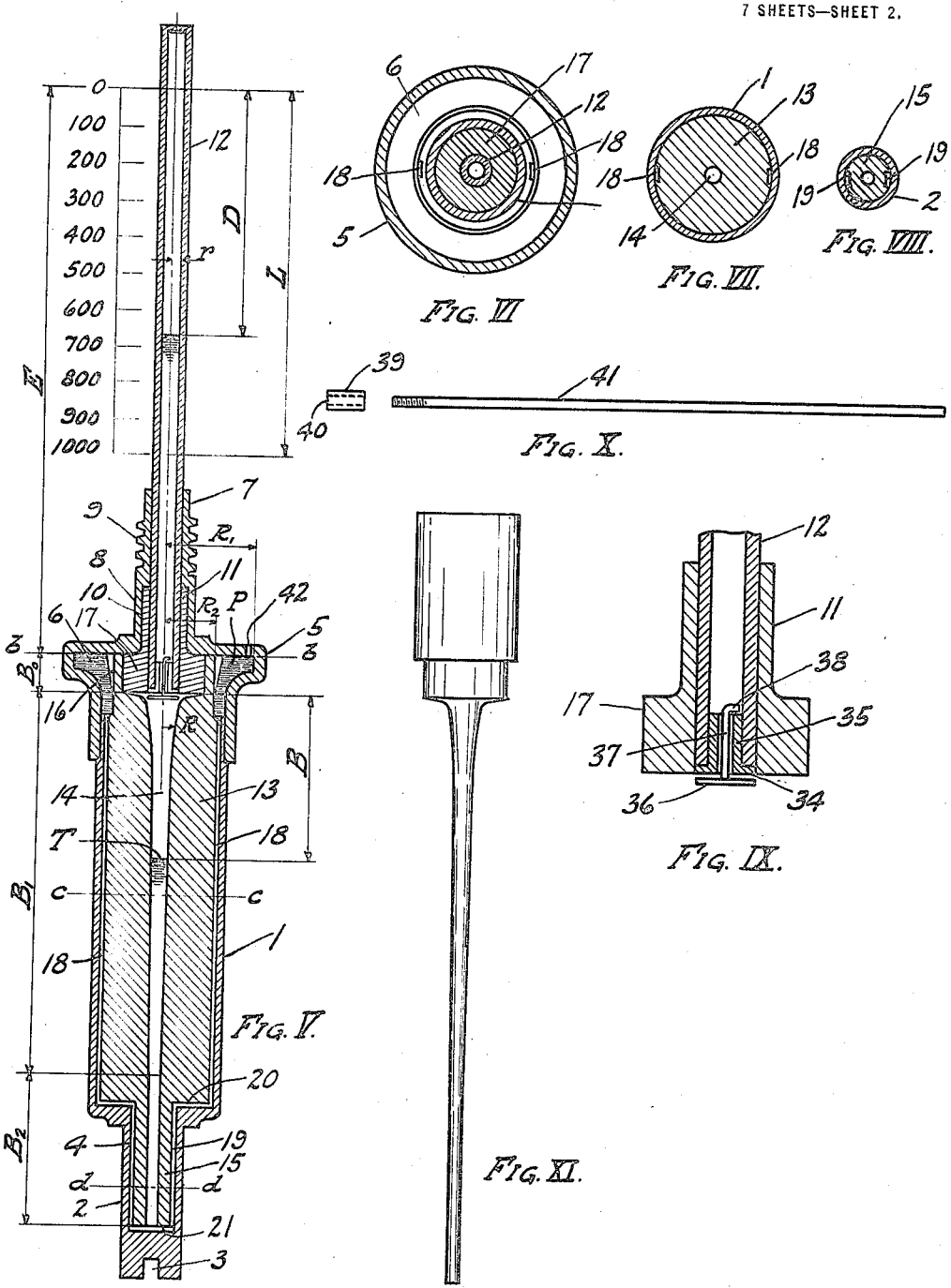

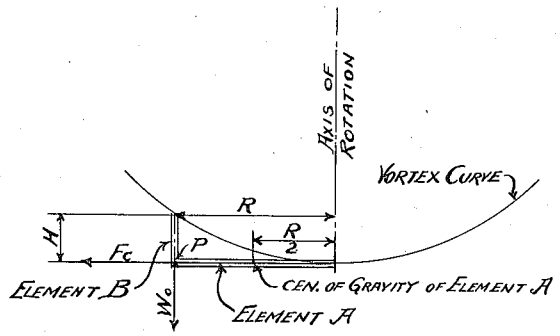
Fig. XII.
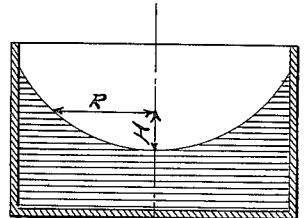
Fig. XIII.
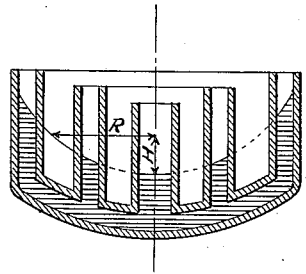
Fig. XIV.
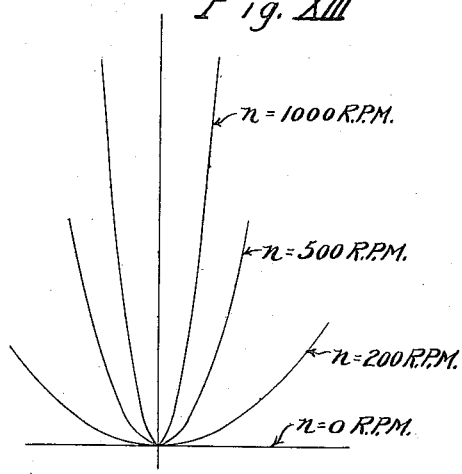
Fig. XV.
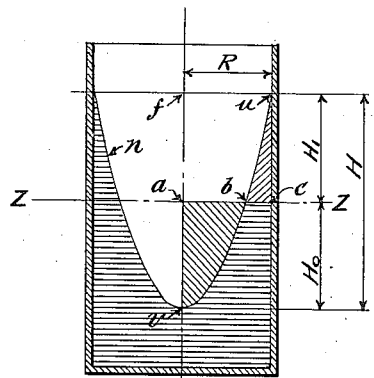
Fig. XVI.

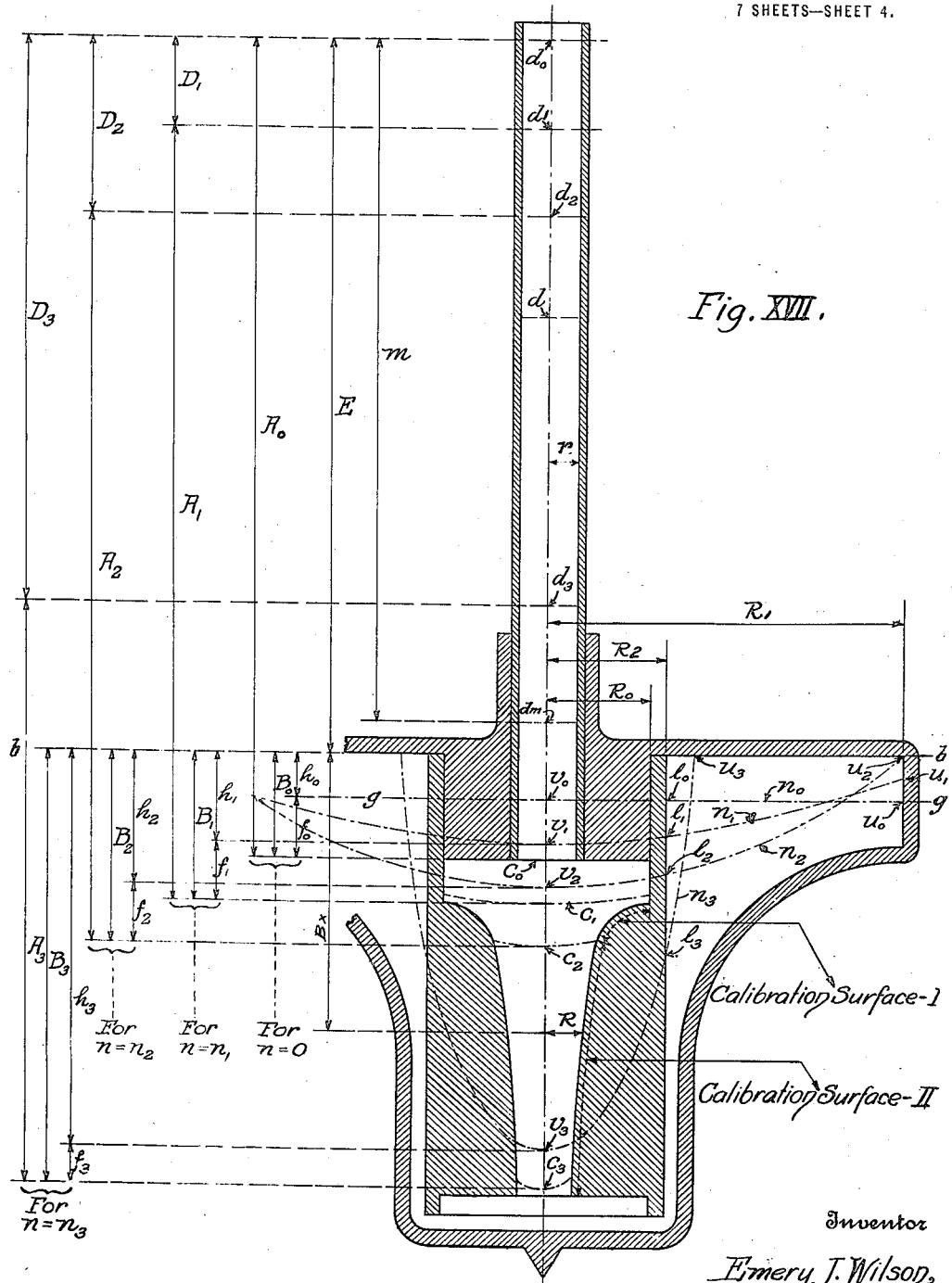
Fig. XVII.

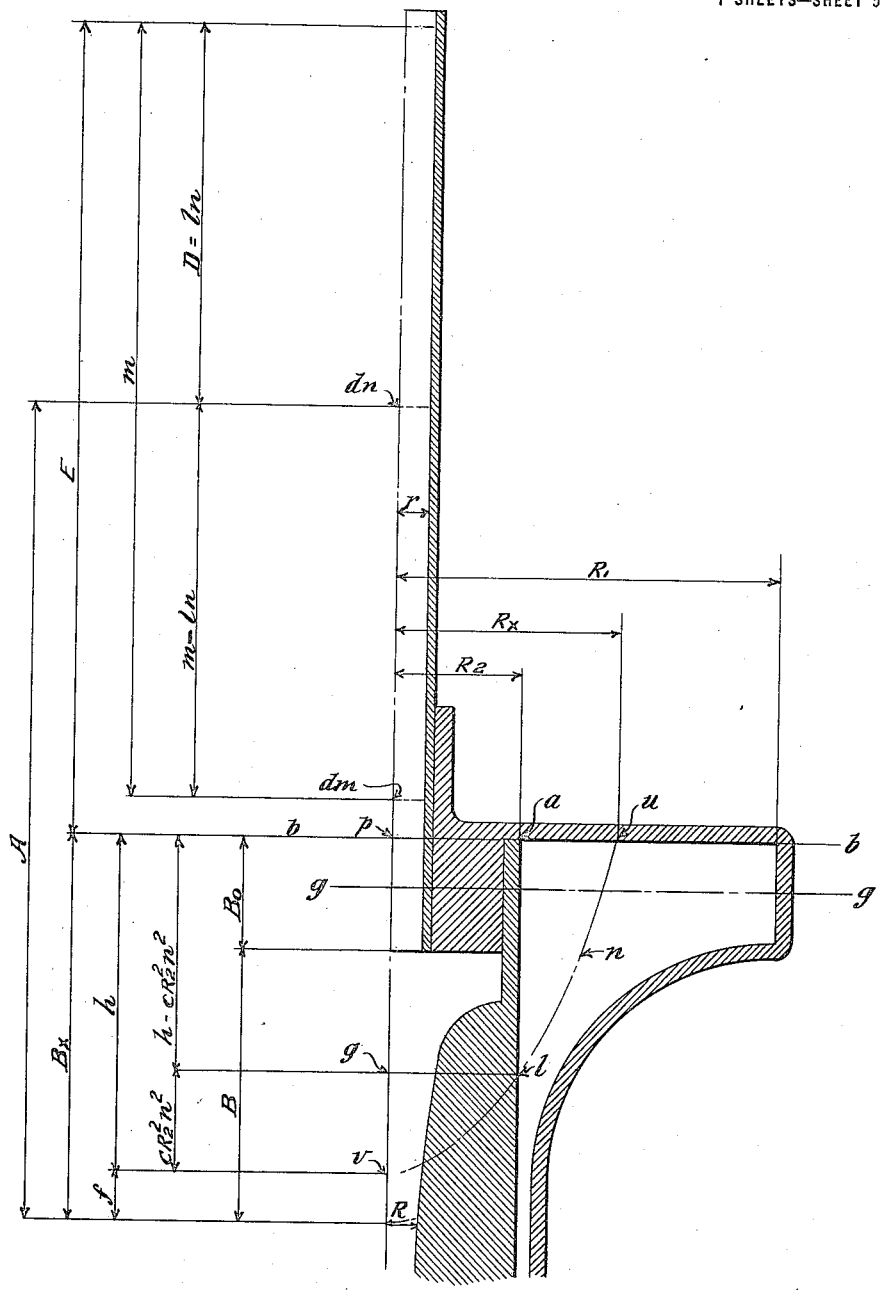
Fig. XVIII.

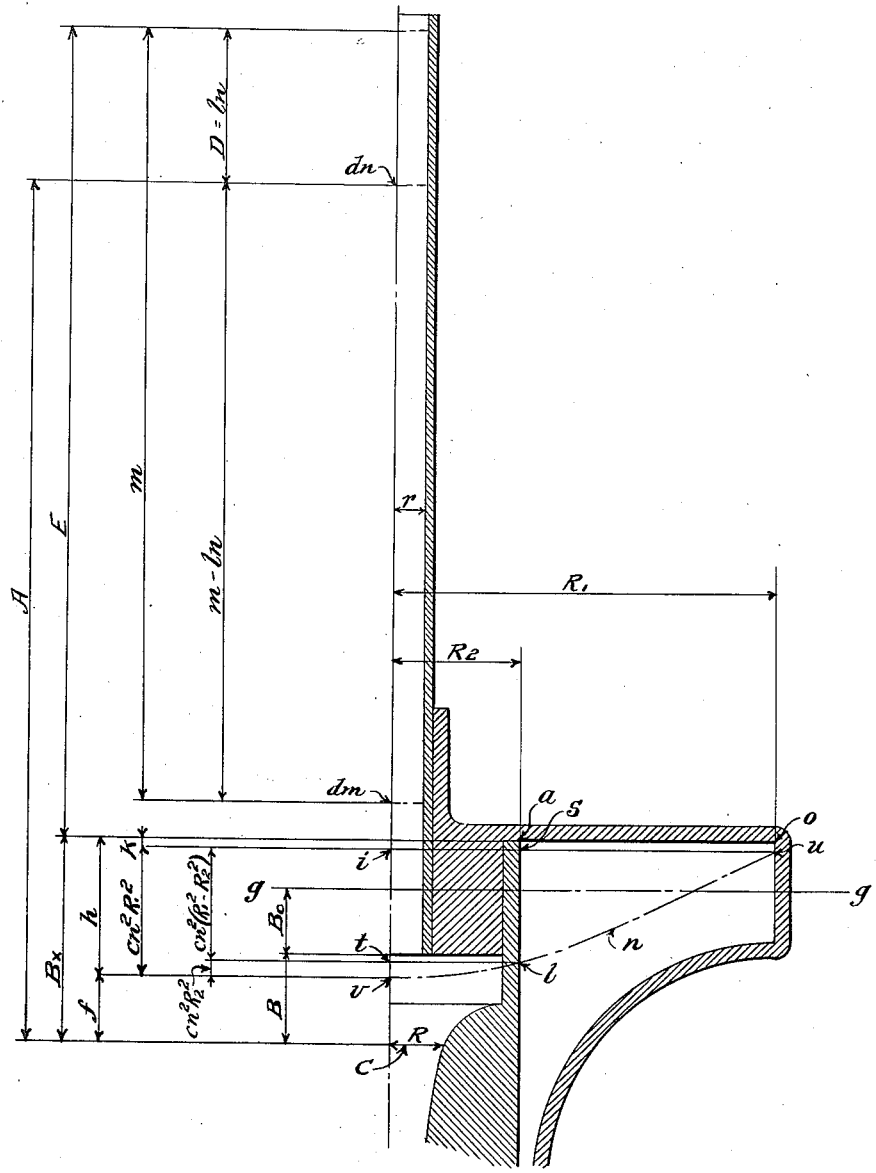
Fig. XIX.

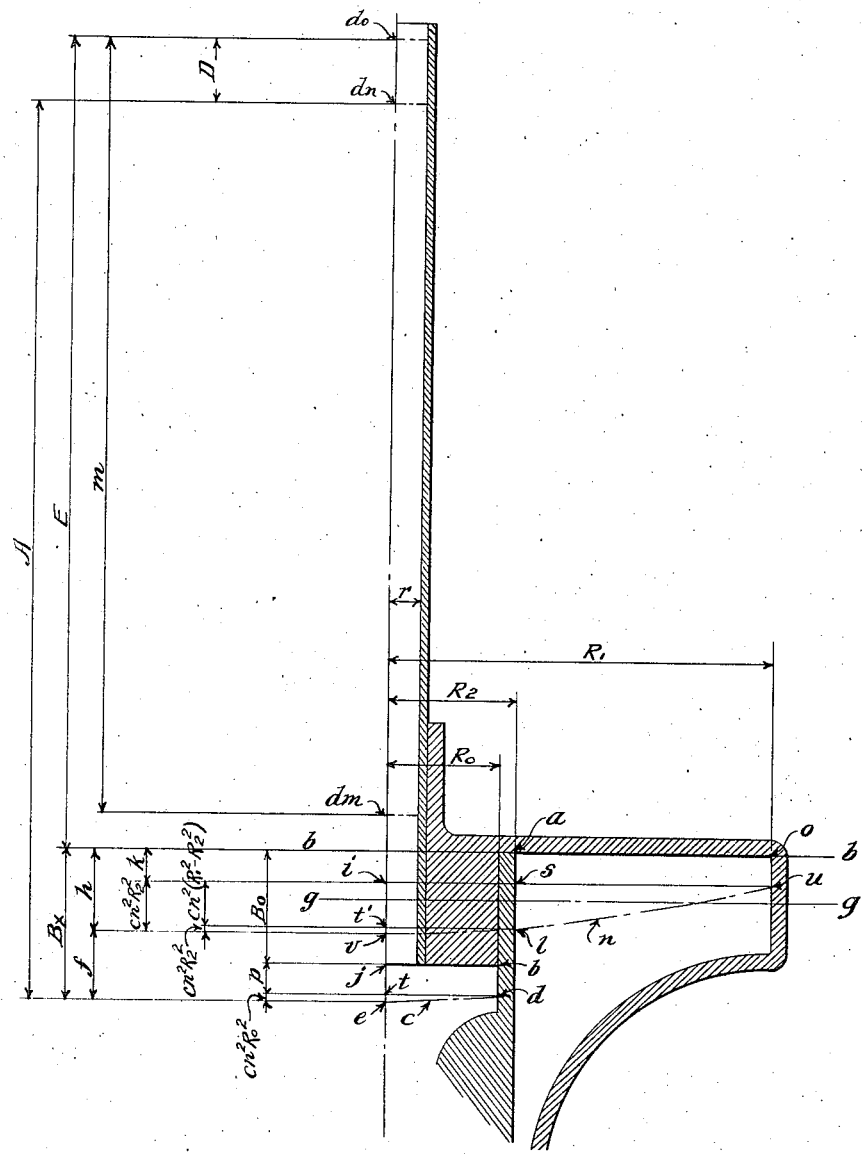
Fig. XX.

UNITED STATES PATENT OFFICE.

EMERY J. WILSON, OF CLEVELAND, OHIO.

ROTARY SPEED INDICATOR.

1,416,082. Specification of Letters Patent. Patented May 16, 1922.

Application filed December 21, 1916. Serial No. 138,212.

*To all whom it may concern:*

Be it known that I, EMERY J. WILSON, citizen of the United States, residing at Cleveland, in the county of Cuyahoga and State of Ohio, have invented certain new and useful Improvements in Rotary Speed Indicators, of which the following is a specification.

This invention relates to rotary speed indicators in which the speed of rotation is indicated by the action of centrifugal force of liquids contained in a rotatable receptacle.

Confined liquids, when subjected to rotation, take on the characteristics of a parabolic vortex, the vortex changing its contour in presence of changes in speed, due to the fact that the parameter of the parabola is a function of the speed; under speed changes, the contour of the vortex changes, the focal point of the parabola shifting with the change of speed, so that the vertex is shifted, this action taking place in accordance with the well known laws of centrifugal forces.

It is well known that where the container for the liquid mass is tubular and unrestricted at its upper end, the change in parabolic contour due to changes in speed provides non-uniform changes in position of the vertex in presence of equal increments of speed, the upper limit of the vortex travelling vertically along the cylindrical wall of the container, the position of the vertex shifting in the opposite direction from the level of the fluid at rest, these conditions being in exact accord with the laws of centrifugal forces.

It is also well known that if a container, revolving about a vertical axis, has its upper end formed with a horizontal surface which can be traversed by a free surface of the liquid mass, the distances traversed by the vertex will be equal for equal increments of speed during such portion of the movement of the free surface of the liquid as the free surface may be in contact with such horizontal surface so long as the vortex of the parabola is continuous; during the remainder of the shifting movement of the free surface along the vertical walls of the container, the distances traversed by the vertex will vary unequally with equal increments of speed.

In both of these instances, however, the container for the liquid mass is so formed as to provide for a parabolic contour which is continuous throughout the contour length. As presently described, the conditions change when the continuity of the parabolic contour is broken, and this is particularly true with respect to the second type referred to, in that the presence of an interruption in the continuity of the free surface of the vortex has the effect of rendering the distance represented by the displacement or length of shift of the vertex unequal for equal increments of speed.

Attempts have heretofore been made to utilize the two types described for the purpose of indicating speeds of rotation, the movements of the liquid under the action of centrifugal forces being utilized to give visual indication of the speed of rotation of the liquid container. Some attempts have been based on the use of the vertex of the vortex as the basis upon which to produce the indications, while in other attempts the indications have been based on the use of the upper limit of the vortex. In those attempts wherein the free surface of the vortex is continuous, the forms utilizing the upper limit of the vortex as the indicator are of the tubular type above referred to, and the shifting in position of the upper limit is unequal for equal increments of speed; and where the vertex is used for producing the indications, under these conditions, the liquid employed has been more or less transparent in order that the vertex may be noted through the portion of the mass in which the vertex is located; the difficulties relative to inspection of the vertex position under these conditions are well known. And where the second type above referred to is employed, the indication must be provided by the shift in position of the vertex thus bringing in the difficulties inherent in the vertex use.

There is, an additional difficulty presented in these types in connection with the indicator, due to the fact that the length of shifting movement of the vertex varies with equal increments of speed, the shift at the lower speeds being of less distance than those at the higher speeds. The effect of this will be understood by assuming the use of a container of this type for registering the miles per hour speed of an automobile. If, for instance, the R. P. M. of an instrument required to indicate 5 miles per hour is two hundred, twenty-four hundred R. P. M. would be required to produce the indications for 60 miles per hour. The length of shift of the vertex between twenty-three hundred and twenty-four hundred R. P. M. would be comparatively large but in accordance with the laws of centrifugal forces; the length of shift of the vertex at 5 miles per hour would be considerably smaller, but for increments of speed from zero up to the two hundred R. P. M. representing the 5 miles per hour, the length of shift would be so small as to practically set up the conditions of inaccuracy. It is because of this fact that speedometers of the centrifugal type and which utilize liquids, make no serious attempt to provide for accurate indication below a certain speed limit.

And in instruments of the second type, wherein a horizontal surface is employed at the upper end of the container, similar conditions are present by reason of the fact that the level of the liquid mass at rest is on a plane parallel to and spaced from such horizontal surface, and the free surface of the liquid mass must traverse the vertical cylindrical wall of the container before it reaches the horizontal surface, the result being that during so much of the travel of the free surface as is along such vertical cylindrical face such travel sets up the conditions of unequal length of shift of the vertex, and the equal length of the shift begins only after the limit of the vortex has reached the horizontal surface. Hence, instruments of this particular type make no serious attempt to provide for indications below the R. P. M. required to bring the vortex limit to such flat surface.

In these attempts the indications have been provided in different ways, some depending on visual inspection of the vertex, while others have used a second liquid as the indicator; these latter generally attempt to vary the shape of the container for the second liquid for the purpose of compensating for the unequal length of shift of the vertex, but these present difficulties in producing accuracy in indication as well as producing difficulties in manufacture and increase in cost.

I have found that these difficulties can be overcome by setting up the conditions of a forced position of equilibrium of the liquid mass which forms the basis of action of the indicator; instead of utilizing the natural positions of equilibrium of the liquid mass presented at the different speeds, I have found it possible to set up conditions in which the increment of liquid mass flow which becomes shifted in presence of a speed increment between two speed rates is equal to the increment of mass flow present in a speed increment of equal amount between two other speed rates. As a result, I have found it possible to utilize that portion of the free surface of the liquid mass which corresponds to the vertex of the vortex as the basis for producing visible indication of the speed of rotation with the indications uniformly spaced.

These forced or definite positions of equilibrium can be obtained by the use of what may be termed a compensation face or faces of the carrier or container for the mass of liquid which constitutes the working mass, such face or faces being positioned to be traversed by a free surface of such mass, the cross-sectional contour of the face or faces being such as to produce the necessary compensation required to provide for this equality of mass-increment flow in presence of equal increments of speed. This face can be given a definite contour to produce this compensating action by mathematical derivation, the face forming a wall of the portion of the confining structure with which the mass-flow increment co-operates. The particular contour employed is made dependent on various factors, some of which are constant and others variable, but the use of the face permits other walls to be of arbitrary characteristic and of simple form such as can be readily utilized in deriving the specific contour of the controlling or compensating face.

This underlying fundamental of the invention—the establishing of definite positions of equilibrium of the mass at definite speeds of rotation or the establishing of contours such as to produce volumetric displacement of mass in presence of definite speeds of rotation—can be readily understood from the particular embodiment of the invention herein disclosed. The rotatable carrier is formed to provide inner and outer chambers in permanent communication, with the working mass having a free surface in each chamber, the surfaces being connected through the body of the liquid mass. The indicator is in the form of a fluid supported by the free surface of the liquid within inner chamber, this free surface thus becoming a surface of contact between the two liquids, the indicating liquid being movable within a tubular portion arising from and adapted to be in open communication with the inner chamber in operation.

With the indicating tube of uniform cross-section, and in the absence of a compensating face, it will be understood that under the natural conditions produced by centrifugal action, the travel of the indicating surface of the indicating liquid would vary with equal increments of speed. When however, the compensating face or faces are employed the position of the vertex can be established so as to set up the position of equilibrium of the liquid mass at a definite speed of rotation, the result being that the position of the vertex can be so located as to provide for a predetermined travel of the indicating surface of the indicating liquid. In the particular form shown the compensating face is located in the inner chamber of the carrier, and is formed in such manner that the position of equilibrium of the liquid mass will be established when the volumetric displacement represented by the movement of the liquid mass free surface of and within the inner chamber—the volume generated or developed by the movement of this free surface in traversing the face—has a value such as to accommodate for flow of the volume of indicating liquid moved through the desired distance represented by the speed increment.

The invention further embodies features which enable the vital proportions of the construction on which the calculations are based to be attained with exactness and ease in manufacturing, so that each individual instrument does not have to be calibrated, or its scale laid out empirically. A further feature of the invention is that the scale graduations can be equally spaced, each space corresponding to a uniform change of speed of rotation; or they can be spaced in any desired manner, each space corresponding to a predetermined change of speed of rotation.

The essential elements of my new device comprise a rotatable receptacle having suitably arranged chambers and passages containing a heavier liquid, one of said chambers containing a portion of a lighter liquid superimposed upon the heavier liquid, the displacement of the top surface of said lighter liquid due to the combined action of gravity and of centrifugal force of the liquids, serving to indicate the speed of rotation.

My preferred form of construction comprises an axial chamber, an annular chamber concentric with the axis and passages connecting the two chambers, an axial transparent tube located above the axial chamber and in communication with it, said tube containing the lighter liquid column which is supported upon mercury contained in said chambers and passages, the axial chamber containing a portion of both liquids, the top end of the lighter liquid column in the tube serving as an index and the amount of its vertical displacement from its initial zero position, due to the combined action of gravity and of centrifugal force of the liquids, being indicated upon a fixed scale located adjacent to the tube. The said axial chamber is made of varying cross sectional area forming a funnel shaped passage the function of which is to make the index end of the lighter liquid column travel through equal distances for uniform changes of speed of rotation, the wall of the passage forming the compensating face of the instrument. Since the top surface of the mercury in the funnel shaped passage moves through distances which vary as the square of the number of revolutions in a given time, while it is desired to make the top surface of the lighter liquid column move through corresponding distances in the transparent tube which are directly proportional to the speed, it is only necessary to so vary the cross sectional area of either passage that equal volumes are swept through by each surface for uniform changes of speed. The generating curve of this funnel shaped chamber can be figured mathematically to a nicety and, in manufacture, this chamber can be produced by moulding a suitable material over a forming tool which has previously been turned and ground to exact calipered diameters for practically its entire length. This insures absolute uniformity of shape and size for this chamber and inexpensive manufacture when these parts are made in large quantities.

A convenient specific embodiment of my invention is illustrated in the accompanying drawings in which Figs. I and II are front and side elevations respectively of the device assembled; Fig. III is a section on the line $a$—$a$ of Fig. II; Figs. IV and V are axial sections of the parts which rotate and show respectively the positions assumed by the two liquid mediums when the apparatus is at rest and when it is rotated at a given speed; Figs. VI, VII and VIII are sections on the lines $b$—$b$, $c$—$c$ and $d$—$d$ respectively of Fig. V; Fig. IX is an enlarged section of the packing bushing and lower end of the transparent tube, and shows the valve mechanism; Fig. X is a view of the plunger and operating rod used in charging the instrument; Fig. XI is a view of the forming tool used in moulding the axial chamber; Figs. XII to XX are diagrammatic views illustrating the factors utilized in developing the formulæ for the compensating surface of the instrument.

In the figures, 1 indicates the outer cylindrical casing provided at its lower end with an extension 2 to form a journal, said extension having a slot 3 for receiving the cross pin of a flexible driving shaft as is customary in automobile practice. The extension 2 has a cylindrical recess 4 for a purpose shown later. The upper end of the casing 1 is adapted to receive a tight fitting cap 5 which has an annular chamber 6 and an extension 7 forming a journal 8 and a screw thread 9, which thread serves as a worm for driving the distance recording mechanism later described. The extension 7 has a cylindrical recess 10 for receiving a packing bushing 11 through which passes the transparent tube 12.

Within the casing 1 is a cylindrical core 13 having an axial chamber 14 communicating with the tube 12. The lower end of the core is reduced in diameter forming an extension 15 which enters the recess 4 of the casing. The upper end of the core is also shown reduced slightly in diameter at 16, forming the inner wall of the annular chamber 6, and has a cylindrical recess adapted to receive the enlarged end 17 of the packing bushing 11. The outer surface of the core is grooved to form, in conjunction with the inner surface of the casing 1, the vertical passages 18, 19, and radial passages 20; and a clearance is left at the end of the extension 15 to form a cylindrical chamber 21; so that there is a liquid communication established between the lower end of the axial chamber 14 and the annular chamber 6.

The entire rotating unit is supported by its journals 2 and 8 in bearings 22 and 23 mounted on a frame 24. The lower bearing 22 has a threaded extension 25 to which may be attached the supporting coupling at the end of the flexible driving shaft (not shown), common in automobile practice. The upper bearing serves also to support the driving mechanism for the number wheels 26, 27, shown enclosed in a suitable casing 28. Since this mechanism is of common use and does not concern this invention, further detail and description is not deemed necessary.

A scale support 29 attached to the upper end of frame 24 is provided with a groove 30 which encloses on three sides the upper part of the transparent tube 12, the front face of said support being adapted to hold the scale plate 31 which has a longitudinal slot 32 through which the movement of the lighter liquid column in the tube can be seen, and graduations 33 by which the amount of said movement can be measured. In Figs. IV and V the scales are shown simply in outline and the numbers opposite the divisions indicate revolutions per minute made by the receptacle. In Fig. I the numbers on the scale indicate miles per hour as is customary in automobile practice.

In order to prevent the mercury from entering the tube 12 when the instrument is inverted, thereby displacing the lighter liquid and rendering the instrument inoperative, a valve device is used, shown in Fig. IX, comprising a valve seat 34 having a hollow tubular projection 35 which fits tightly within the bore of the tube 12, a valve 36 suspended by a pin 37 which passes loosely through the valve seat and has its upper end 38 bent over the top of the projection 35 thereby holding the valve in place but allowing it sufficient vertical movement to open. The valve and pin are heavier than their equivalent volume of lighter liquid but lighter than their equivalent volume of mercury. When the instrument is upright and at rest the mercury rises to the level of the valve seat and the valve is closed. When however the device is rotated at any speed the mercury descends in the axial chamber and the valve opens and remains open due to its own weight, allowing the lighter to pass through in either direction. When the instrument is inverted the weight of the mercury holds the valve against its seat and prevents the mercury from entering the tube 12.

Since the lighter liquid suitable for use in this class of devices is more or less volatile when exposed to the atmosphere, it is desirable to seal all joints air tight. Furthermore my formulæ are derived on the assumption that equal pressure exists at the top end of the lighter liquid column and at the free surface of the mercury in the cap chamber 6. To effect this condition either a vacuum must be produced at these points or a by-pass tube must connect them. Since the latter arrangement adds manufacturing difficulties by complicating the construction, and is also open to serious objections relating to errors introduced by temperature changes acting upon the confined air volumes, the following simple means is utilized in producing the required vacuum in these chambers. Referring to Fig. X the plunger 39, adapted to fit air tight within the bore of the tube 12, is provided with a small hole 40 to receive the threaded end of the operating rod 41. In charging the instrument mercury is first poured in at the upper end of the tube 12 until it has completely filled the funnel shaped chamber 14, the vertical and radial passages 18, 19 and 20, the bottom chamber 21, the cap chamber 6, and overflows through the small hole 42 in the upper wall of the cap. Next the lighter liquid is added until the tube 12 is filled with it up to the zero point on the scale. As this is added a small amount of mercury will overflow at the hole 42 due to the weight of the superimposed column of lighter liquid. The plunger 39 is then inserted in the upper end of the tube 12 and by means of the rod 41 forced downward through the tube a predetermined distance $m$, thereby forcing out of the hole 42 a definite volume of mercury equal to $v=m$ times the area of the tube bore. The plunger is then withdrawn from the tube allowing the liquids to assume their positions of equilibrium. The top of the lighter liquid column will not return quite as high as the zero point due to the loss of mercury displaced by the downward stroke of the plunger. More of the lighter liquid is then added to restore the lighter liquid column to its initial zero position, and the plunger again inserted in the tube and forced downward through the distance $m$. The mercury then will just fill the hole 42 but will not overflow. This hole is then plugged and sealed air tight, the plunger withdrawn to its final location at the top of the tube, the rod 41 cut off at the top end of the plunger and the end of the tube 12 sealed permanently. We now have an air tight container from which all air has been excluded, the two liquids confined therein and in equilibrium, and a clearance volume $v$ of known amount in the chamber 6.

The operation of the device is as follows: Fig. IV shows the positions assumed by the two liquid mediums when the device is at rest. The top of the lighter liquid column is at zero on the scale, the top of the axial mercury column is at the line $f$—$f$ and the top surface of the mercury in the chamber 6 is at the level $g$—$g$, previously determined by the clearance volume $v$ and the proportions $R_1$ and $R_2$ of the annular chamber 6. The difference in level between the mercury surfaces at $f$—$f$ and $g$—$g$, due to the weight of the superimposed lighter liquid column in the tube 12, is determined by the known heights E and $B_0$ (Fig. V) and the specific gravities of the two liquids. When the receptacle is rotated at any given speed the liquids assume a new position of equilibrium, shown in Fig. V, due to the combined action of centrifugal force and gravity. The laws governing this action are known and definite. The free surface P of the mercury in the cap chamber 6 assumes the form of a paraboloid. The top or free surface of the axial mercury column has descended through a certain distance B determined from formulæ based upon the above mentioned laws, and the top or index end of the lighter liquid column has descended through the distance D which, as previously explained, can be made directly proportional to the speed of rotation by varying the cross sectional area of the axial chamber 14.

Formulæ have been derived which express the relation between D and B, and between D and R, the variable radius of the axial chamber; so that for any given value of D, the simultaneous values of B and R are known; hence the generating curve of the funnel shaped chamber is determined. In these formulæ the coefficients of the variables B, D and R are constants depending upon the values assumed for the following so called vital proportions of the instrument. Referring to Fig. V:—

$R_1$=maximum radius of annular chamber 6.
$R_2$=minimum radius of annular chamber 6.
$r$=radius of bore of transparent tube 12.
L=indicating length of scale.
E=distance from zero point on scale to top of cap chamber 6.

In the derivation of the above mentioned formula the volume $v$ of the clearance space in chamber 6 when the instrument is at rest is an important factor and is considered a feature of the invention.

It is evident that the distance $m$ which determines the volume $v$ must be at least equal to the indicating length L chosen for the scale; otherwise this clearance space would become filled with mercury before the lighter liquid column has descended to the lower end of the scale. Furthermore the calculations show that unless this distance $m$ is considerably greater than L, the funnel chamber starts to flare outward, i. e., increase in diameter towards its lower end, an objectionable condition in point of manufacture. This value $m$ is therefore so chosen that the values of R in the formula, corresponding to increasing values of D, decrease throughout the range of action $B_1$ of the mercury surface T, which range corresponds to the maximum range of the scale L. The funnel chamber is moreover made longer than that required in order to prevent the bottom end of the lighter liquid column from descending beyond the lower end of the funnel chamber when the instrument is charged as described above by forcing the plunger downward in the tube 12 through the distance $m$. This extended length $B_2$ of the funnel chamber may be of uniform bore or of slightly contracted diameters not necessarily following the diameters as calculated from the formula, since this part of the chamber is not operative for speeds within the established length of the scale.

As will be understood, the compensating face in the embodiment of the invention disclosed herein, is produced by the wall of the axial chamber, the outer chamber, having the flat face, indicated in Figure V at $b\ b$. As shown in Fig. IV, the normal level of the liquid in the outer chamber is below and in parallel spaced relation to the face $b\ b$, when at rest, this level being indicated at $g\ g$. As will be understood, the development of speed causes the free surface of the outer chamber to first traverse the cylindrical vertical wall represented by the radius $R_1$, this portion of the travel of the free surface having the characteristics of the travel of the limit of the vortex in a tube, the free surface then beginning to traverse the face indicated as $b\ b$ which is a plane face extending at right angles to the axis of the face having a radius $R_1$. By reason of this presence of the two faces, the calibrated wall of the axial chamber is developed by the use of different formulæ, and this wall contour of the inner or axial chamber is thus formed with what may be termed two calibration surfaces, as indicated, for instance, in Fig. XVII. It should be noted that, for the purpose of illustrating the methods of producing the formulæ, Figs. XVII to XX are not drawn strictly to scale, parts being exaggerated in order to provide for clear illustration. On the contrary, Figs. IV and V are drawn to the scale of an instrument in actual operation. For these reasons, the showing of the diagrammatic views differs somewhat from that of the structural views, one of these differences being in the distance beneath member 17 in Figs. IV and V, the showing in Figs. IV and V indicating a lack of space at this point; however, in the actual structure, there is a space having the diameter of member 17 in Figs. IV and V and with a width of .02 inch at such point, and in the diagrammatic views this distance is shown greatly exaggerated.

The specific formulæ employed in determining the compensating face are, of course, dependent upon the characteristics of the instrument itself, as for instance the location of the compensating face, the character of the indicating mechanism, forms of chambers, etc., and in presenting formulæ for the production of the instruments shown in Figs. IV and V, the arbitrary faces are assumed to be those shown in these figures, these faces being arbitrarily selected. It may be noted, that in this selection the particular characteristics of the faces which are traversed by the spaced apart free surfaces of the liquid mass throughout the zone of change in vortex contour are determining factors. And in referring to the free surfaces of the liquid mass, it is to be understood that the top surface of the heavier liquid in the axial chamber is considered as one of these free surfaces, since it is not confined by the wall of such chamber; this surface, of course, in the particular embodiment shown, is in contact with and supports the indicating fluid, so that the free surface of the axial chamber can also be considered as a contact surface, and is referred to herein as such more particularly to distinguish it from the free surface of the liquid within the outer chamber.

To permit of the production of a structure of the general type disclosed in Figs. IV and V, with the basic features of the present invention forming part of such structure, the following description is given showing the fundamentals and the fundamental characteristics upon which the invention is based, together with the development of formulæ to indicate the manner in which a structure of the type herein disclosed can be produced by mathematical derivation of the compensating face employed, Figs. XII to XX illustrating diagrammatically the different factors employed in this description.

The development of the formulæ employed is based upon a number of fundamentals which can be briefly described as follows:

The free surface of a revolving liquid mass contained in a receptacle is parabolic in form and defined by the equation $$R^2 = \frac{1}{cn^2}H \quad \text{(1)}$$

in which R and H are the variable coordinates, $c$ is a constant, and $n$ is the speed of rotation.

The values referred to in Figure XII are as follows:

$F_c$ = liquid pressure at P due to centrifugal force of element A.
$W_o$ = liquid pressure at P due to weight of element B.
$F_c = W_o$.

Formula for centrifugal force: $F = \frac{W}{g}\frac{v^2}{R_1}$

F = force in pounds;
W = weight in pounds;
$R_1$ = radius in feet from axis of rotation to center of gravity of W;
$g$ = acceleration due to gravity = 32.16;
$v$ = velocity in feet per second of center of gravity of W.

For the following units—

$n$ = R. P. M.

$r$ = radius in inches = $12R_1$ or $R_1 = \frac{r}{12}$ $$v = \frac{2\pi\left(\frac{r}{12}\right)n}{60}$$

We have—

$$F = \frac{W\left(\frac{2\pi\frac{r}{12}n}{60}\right)^2}{g\frac{r}{12}} = \frac{4\pi^2\left(\frac{r}{12}\right)^2 n^2 W}{60\times 60 \times g\left(\frac{r}{12}\right)} = \frac{\pi^2 r W n^2}{3\times 60^2 g} = .0000284 W r n^2$$

Let $w$ = weight per unit of volume of A and B.
$a$ = cross sectional area of A and B.

Then $$F_c = .0000284\,(waR)\frac{R}{2}n^2 = .0000142\,waR^2n^2$$

$$W_o = waH$$

Hence:—

$$.0000142\,waR^2n^2 = waH$$
$$.0000142\,R^2n^2 = H$$
$$cR^2n^2 = H$$

$$\therefore R^2 = \frac{1}{cn^2}H$$

It does not matter whether this free surface is continuous as shown in Fig. XIII, or subdivided into separate portions as shown in Fig. XIV, provided there is a liquid communication between the separate portions. The form of the parabola depends only upon the speed of rotation since the parameter $$\frac{1}{cn^2}$$

is a function of the speed only. In Fig. XV for example, the parabolas $n=0$, $n=200$, $n=500$, and $n=1000$ R. P. M. show the forms of the vortexes assumed by the liquid when rotated at these speeds. While this figure shows the form of the different vortexes, this showing does not correctly locate the vertex of one form relative to the other, the vertexes of the several forms being shown as located at the same point; as shown in Fig. XVII, the vortex contours cross each other at different speeds, the vertex shifting downwardly as the speed is increased. These forms are independent of the size or shape of the confining vessel. The parabolas shown in Figs. XIII and XIV are identical if the speed of rotation is the same.

In a vessel of known size and shape, if the position of the liquid vortex corresponding to a given speed of rotation is known, the positions of other vortexes corresponding to different speeds are determinate. Only those confining walls of the vessel which are traversed by the free parabolic surface of the liquid need be known; the form and location of other confining walls or connecting passages do not affect the calculations.

In order to calculate these vortex positions, the confining walls which are traversed by the free surface of the liquid are chosen as simple plane or cylindrical surfaces and the level of the liquid at zero speed is assumed. For example, Fig. XVI shows a simple cylindrical tube of radius $= R$, rotatable about a vertical axis at its center. The level of the liquid at zero speed is at Z—Z, and $n$ is the parabolic vortex corresponding to a speed $= n$ (R. P. M.).

Let V$abv$ and V$bcu$ indicate the volumes generated by revolving the cross-sectional areas $abv$ and $bcu$ respectively about the axis. Since the volume of the space below Z—Z must equal the volume of the liquid above Z—Z, we have:—

$$\mathrm{V}abv = \mathrm{V}bcu = \mathrm{V}acuf - \mathrm{V}abuf$$
$$= \mathrm{V}acuf - (\mathrm{V}fubv - \mathrm{V}abv)$$
$$\therefore \mathrm{V}acuf = \mathrm{V}fubv$$
$$\pi R^2 H_1 = \frac{\pi}{2} R^2 H$$
$$2H_1 = H_1 + H_0$$
$$H_1 = H_0$$

From (1) $H = H_1 + H_0 = cR^2n^2$
$$2H_1 = cR^2n^2$$
$$H_1 = \frac{c}{2}R^2n^2$$

Hence both the base $fu$ and the vertex $v$ of the vortex move through distances (measured from Z—Z) which are proportional to the square of the speed.

By the use of the vortex curves above described, in combination with a container having some of its confining walls of known proportions, it is possible to not only determine mathematically the positions of equilibrium of the liquid mass for given speeds of rotation; but also, to so derive, mathematically, one or more of these confining walls for the purpose of producing conditions under which the indicating portion of the liquid will assume predetermined positions at the given speeds, i. e., a uniform scale spacing can be used. This derived surface may be termed a calibration surface.

Fig. XVII shows a schematic arrangement of the speed indicator shown in Figs. IV and V but drawn out of proportion in order to indicate in detail the movement of the vortexes as well as indicating the confining surfaces traversed by them.

The operation of the instrument shown in Fig. XVII is as follows:—The top end of the alcohol column is called the "index". The surface of contact between the two liquids is called the "contact surface". When the instrument is at rest the level of the mercury in the discharge chamber is at $g$—$g$; the contact surface is at $c_0$; and the index is at $d_0$.

(1) As the speed increases from $n=0$ to $n=n_1$:—The upper limit of the vortex curve travels upward from $u_0$ to $u_1$ along the outer wall, radius $= R_1$, of the discharge chamber; the lower limit of the vortex curve in the discharge chamber travels downward from $l_0$ to $l_1$ along the inner wall, radius $= R_2$, of the discharge chamber; the vertex of the parabola travels downward from $v_0$ to $v_1$ along the axis; the contact surface travels downward from $c_0$ to $c_1$ along the wall, radius $= R_0$, of the central chamber; and the index travels downward from $d_0$ to $d_1$ in the glass tube. For this range of action the scale spacing is not uniform.

(2) As the speed increases from $n=n_1$ to $n=n_2$:—The upper limit of the vortex curve travels upward from $u_1$ to $u_2$ along the outer wall of the discharge chamber; the lower limit of the vortex curve in the discharge chamber travels downward from $l_1$ to $l_2$ along the inner wall surface; the vertex of the parabola travels downward from $v_1$ to $v_2$ along the axis; the contact surface travels downward from $c_1$ to $c_2$ along the upper calibration surface I; and the index travels downward from $d_1$ to $d_2$ in the glass tube. For this range of action the scale spacing is uniform due to the functioning of the calibration surface I.

(3) As the speed increases from $n=n_2$ to $n=n_3$:—The upper limit of the vortex curve travels inward from $u_2$ to $u_3$ along the upper wall $b$—$b$ of the discharge chamber; the lower limit of the vortex curve travels downward from $l_2$ to $l_3$; the vertex of the parabola travels downward from $v_2$ to $v_3$; the contact surface travels downward from $c_2$ to $c_3$ along the lower calibration surface II; and the index travels downward from $d_2$ to $d_3$ in the glass tube. For this range of action the scale spacing is uniform due to the functioning of the calibration surface II.

As will be readily understood, the travel of the vertex downwardly permits the liquid in the indicating tube to pass out of the tube into the space above the free surface of the heavier liquid (referred to herein as the liquid mass).

The table below shows what proportions are assumed or are known constants; and what variables depend upon the speed of rotation and such known proportions.

*Assumed or known proportions.*

The top wall of the discharge chamber is a plane called the base surface $b$—$b$.
$R_1$ =radius of outer wall of discharge chamber.
$R_2$ =radius of inner wall of discharge chamber.
$R_0$ =maximum radius of central chamber.
$r$ =radius of glass tube.
$E$ =distance from base surface $b$—$b$ to top end of alcohol column when instrument is at rest.
$m$ =distance through which the top end of the alcohol column has moved when discharge chamber is clear full of mercury.
$l$ =distance through which the top end of alcohol column moves for a change of speed of one R. P. M.
$w_1$ =specific gravity of alcohol.
$w_2$ =specific gravity of mercury.

$$j = \frac{w_1}{w_2}$$

*Variables depending upon the speed of rotation and the above known proportions.*

$h$ =depth of vortex measured from the base surface $b$—$b$ to the vertex of the vortex.
$A$ =height of alcohol column from index to contact surfaces.
$f$ =depression of the top surface of the central mercury column below the vertex of the vortex.
$B_x = h + f$ =distance from base surface to surface of contact between the liquids. This is the vertical coordinate of the calibration curves.
$R$ =radius of calibration surface, or horizontal coordinate of the calibration curves.
$D$ =distance through which the top end of alcohol column has moved for a change of speed from 0 to $n$. When the calibration surfaces are functioning $D = ln$.

The method of deriving the formulæ is as follows:—

Since the volume of the free space in the discharge chamber is always equal to the volume of the tube space which the index surface has swept through in moving from its lowest position $d_m$ to the position $d$ corresponding to the speed $n$, the position of any vortex curve can be determined, and the value of $h$ can be expressed in terms of $n$ and the known constants. The value of $f$ is also a function of $n$ and the known constants. Therefore, the value of $B_x = h + f$ can be expressed in terms of $n$ and the known constants. The value of the horizontal coordinate $R$ of the calibration curves is found in terms of $n$ and the known constants by equating the increment of volume swept through by the index surface to the corresponding increment of volume swept through by the surface of contact. i. e., $$d(ln)\pi r^2 = dB_x \times \pi R^2$$

or $$\frac{1}{R^2} = \frac{1}{lr^2}\frac{dB_x}{dn}$$

In other words, the calibration surfaces are so shaped that the contact surface sweeps through equal volumes for equal changes of speed of rotation.

*Derivation of calibration curve II. (Speeds from $n_2$ to $n_3$.)*

In this case the confining walls of the discharge chamber are the base surface $b$—$b$ and the inner cylindrical surface, radius $R_2$, of arbitrary value. The confining wall of the central chamber is the derived surface. The scale spacing is uniform, i. e., $D = ln$. The object of the calculations is to find the values of the variable coordinates $B_x$ and $R$ in terms of $n$ and the known constants, so that the condition $D = ln$ will be satisfied. Referring to Fig. XVIII:

$$B_x = f + h \quad \text{(2)}$$

$$f = \frac{w_1}{w_2}A = jA = j(B_x + E - ln) \quad \text{(3)}$$

To find the value of $h$: Since the volume of the space in the discharge chamber is equal to the volume swept through by the index surface in moving from its lowest position $d_m$ to the position $d_n$ corresponding to the speed $n$, we have:

$$V aula = \pi r^2 (m - ln) \quad \text{(4)}$$

But $$V aula = V pulvp - V glvg - V palgp = \pi r^2 (m - ln)$$
$$\frac{\pi}{2} R_x^2 h - \frac{\pi}{2} R_2^2 (cR_2^2 n^2) - \pi R_2^2 (h - cR_2^2 n^2) = \pi r^2 (m - ln)$$
$$R_x^2 h - cR_2^4 n^2 - 2R_2^2 h + 2cR_2^4 n^2 = 2r^2 (m - ln) \quad \text{(5)}$$

From (1)  $h = cR_x^2 n^2 \quad \therefore R_x^2 h = \dfrac{h^2}{cn^2}$ $$\therefore \frac{h^2}{cn^2} - cR_2^4 n^2 - 2R_2^2 h + 2cR_2^4 n^2 = 2r^2 (m - ln)$$
$$h^2 - 2cn^2 R_2^2 h + c^2 n^4 R_2^4 = 2r^2 (m - ln) cn^2$$
$$h - cn^2 R_2^2 = \sqrt{2r^2 (m - ln) cn^2}$$
$$h = cR_2^2 n^2 \pm rn\sqrt{2c}\sqrt{m - ln} \quad \text{(6)}$$

Substituting (3) and (6) in (2):—

$$B_x = j(B_x + E - ln) + cR_2^2 n^2 + rn\sqrt{2c}\sqrt{m - ln}$$
$$B_x(1 - j) = jE - jln + cR_2^2 n^2 + rn\sqrt{2c}\sqrt{m - ln}$$
$$B_x = \frac{cR_2^2 n^2 - jln + rn\sqrt{2c}\sqrt{m - ln} + jE}{1 - j} \quad \text{(7)}$$

To find the value of R in terms of $n$ and the known constants:

$$d(ln)\pi r^2 = dB_x \times \pi R^2 \quad \text{(8)}$$

$$\frac{1}{R^2} = \frac{1}{lr^2} \frac{dB_x}{dn} \quad \text{(9)}$$

$$\frac{dB_x}{dn} = \frac{d}{dn}\left(\frac{cR_2^2 n^2 - jln + rn\sqrt{2c}\sqrt{m - ln} + jE}{1 - j}\right)$$
$$= \frac{2cR_2^2 n - jl + r\sqrt{2c}\left[\sqrt{m - ln} + n \cdot \dfrac{1}{2} \cdot \dfrac{(-l)}{\sqrt{m - ln}}\right]}{1 - j}$$

But $$\left[\sqrt{m - ln} - \frac{ln}{2\sqrt{m - ln}}\right] = \frac{2(m - ln) - ln}{2\sqrt{m - ln}} = \frac{2m - 3ln}{2\sqrt{m - ln}}$$

$$\therefore \frac{dB_x}{dn} = \frac{2cR_2^2 n - jl + r\sqrt{2c}\left(\dfrac{2m - 3ln}{2\sqrt{m - ln}}\right)}{1 - j} \quad \text{(10)}$$

Substituting (10) in (9):—

$$\frac{1}{R^2} = \frac{2cR_2^2 n - jl + r\sqrt{2c}\left(\dfrac{2m - 3ln}{2\sqrt{m - ln}}\right)}{lr^2(1 - j)} \quad \text{(11)}$$

$$R = \sqrt{\frac{lr^2(1 - j)}{2cR_2^2 n - jl + r\sqrt{2c}\left(\dfrac{2m - 3ln}{2\sqrt{m - ln}}\right)}} \quad \text{(12)}$$

The equations (7) and (12) give the values of the coordinates $B_x$ and R in terms of the variable speed $n$ and of the known constants. They may be transformed to give the values of B and R in terms of the variable D and the known constants by making the following substitutions of equivalent values:—

Referring to Fig. V:—

Let N = maximum speed, corresponding to total length of scale.

Then $lN = L$ and $ln = D$ or $n = \dfrac{D}{l} = D\dfrac{N}{L}$

Let $c_1 = c\dfrac{N^2}{L^2} = \dfrac{c}{l^2}$ or $c = c_1 l^2$

Then $n = D\sqrt{\dfrac{c_1}{c}}$ and $n^2 = D^2 \dfrac{c_1}{c}$

Substituting these values of $ln = D$, $n = D\sqrt{\dfrac{c_1}{c}}$, $n^2 = D^2\dfrac{c_1}{c}$ in (7), and since $B_x = B + B_o$, we have:—

$$B+B_o = \frac{cR_2^2\left(D^2\frac{c_1}{c}\right)-jD+r\left(D\sqrt{\frac{c_1}{c}}\right)\sqrt{2c}\sqrt{m-D}+jE}{1-j}$$

$$B = \frac{c_1R_2^2D^2-jD+rD\sqrt{2c_1}\sqrt{m-D}+jE}{1-j} - B_o \quad \text{------(7')}$$

Substituting the values of $ln=D$, $n=\frac{D}{l}$, $c=c_1l^2$ in (12) we have:—

$$R = \sqrt{\frac{lr^2(1-j)}{2R_2^2(c_1l^2)\frac{D}{l}-jl+r\sqrt{2c_1l^2}\left(\frac{2m-3D}{2\sqrt{m-D}}\right)}}$$

$$= \sqrt{\frac{lr^2(1-j)}{2c_1R_2^2lD-jl+lr\sqrt{2c_1}\left(\frac{2m-3D}{2\sqrt{m-D}}\right)}}$$

$$R = \sqrt{\frac{r^2(1-j)}{2c_1R_2^2D-j+r\sqrt{2c_1}\left(\frac{2m-3D}{2\sqrt{m-D}}\right)}} \quad \text{------(12')}$$

*Derivation of calibration curve I. (Speeds from $n_1$ to $n_2$).*

In this case the confining walls of the discharge chamber are the inner and outer cylindrical surfaces of radii $R_2$ and $R_1$, of arbitrary values. The confining wall of the central chamber is the derived surface. The scale spacing is uniform, i. e., $D=ln$. The object of the calculations is to find the values of the variable coordinates $B_x$ and $R$ in terms of $n$ and the known constants, so that the condition, $D=ln$, will be satisfied. Referring to Fig. XIX:—

$$B_x = f+h \quad \text{------(13)}$$

$$f = \frac{w_1}{w_2}A = jA = j(B_x+E-ln) \quad \text{---(14)}$$

$$h = cn^2R_1^2+k \quad \text{------(15)}$$

To find the value of $k$:—Since the volume of the space in the discharge chamber is equal to the volume swept through by the index surface in moving from its lowest position $d_m$ to the position $d_n$ corresponding to the speed $n$, we have:—

$$V\text{aoula} = \pi r^2(m-ln) \quad \text{------(16)}$$
$$V\text{aoula} = V\text{aousa} + V\text{suls} = \pi r^2(m-ln)$$
$$V\text{aousa} + V\text{iulvi} - V\text{islti} - V\text{tlvt} = \pi r^2(m-ln)$$

$$\pi(R_1^2-R_2^2)k+\frac{\pi}{2}R_1^2(cn^2R_1^2)-\pi R_2^2[cn^2(R_1^2-R_2^2)]-\frac{\pi}{2}R_2^2(cn^2R_2^2)=\pi r^2(m-ln)$$

$$2(R_1^2-R_2^2)k+cn^2R_1^4-2cn^2R_2^2(R_1^2-R_2^2)-cn^2R_2^4=2r^2(m-ln)$$

$$\therefore k = \frac{2r^2(m-ln)-cn^2(R_1^4-R_2^4)+2cn^2R_2^2(R_1^2-R_2^2)}{2(R_1^2-R_2^2)}$$

$$k = \frac{r^2(m-ln)}{(R_1^2-R_2^2)} - \frac{cn^2}{2}(R_1^2+R_2^2)+cn^2R_2^2$$

$$k = \frac{r^2(m-ln)}{(R_1^2-R_2^2)} - \frac{cn^2}{2}R_1^2 + \frac{cn^2}{2}R_2^2 \quad \text{------(17)}$$

Substituting (17) in (15):—

$$h = cn^2R_1^2 + \frac{r^2(m-ln)}{R_1^2-R_2^2} - \frac{cn^2R_1^2}{2} + \frac{cn^2R_2^2}{2}$$

$$h = \frac{cn^2}{2}(R_1^2+R_2^2) + \frac{r^2(m-ln)}{R_1^2-R_2^2} \quad \text{------(18)}$$

Substituting (14) and (18) in (13):—

$$B_x = j(B_x+E-ln) + \frac{cn^2}{2}(R_1^2+R_2^2) + \frac{r^2(m-ln)}{R_1^2-R_2^2}$$

$$B_x(1-j) = jE-jln+\frac{c}{2}(R_1^2+R_2^2)n^2+\frac{r^2(m-ln)}{R_1^2-R_2^2}$$

$$B_x = \frac{\frac{c}{2}(R_1^2+R_2^2)n^2-jln+\frac{r^2(m-ln)}{R_1^2-R_2^2}+jE}{1-j} \quad \text{------(19)}$$

To find the value of R in terms of $n$ and the known constants:—

$$d(ln)\pi r^2 = dB_x \times \pi R^2 \quad \text{(20)}$$

$$\frac{1}{R^2} = \frac{1}{lr^2}\frac{dB_x}{dn} \quad \text{(21)}$$

$$\frac{dB_x}{dn} = \frac{d}{dn}\left(\frac{\frac{c}{2}(R_1^2+R_2^2)n^2 - jln + \frac{r^2(m-ln)}{R_1^2-R_2^2} + jE}{1-j}\right)$$

$$= \frac{c(R_1^2+R_2^2)n - jl + \frac{r^2}{R_1^2-R_2^2}(-l)}{1-j}$$

$$\therefore \frac{dB_x}{dn} = \frac{c(R_1^2+R_2^2)n - jl - \frac{r^2 l}{R_1^2-R_2^2}}{1-j} \quad \text{(22)}$$

Substituting (22) in (21):—

$$\frac{1}{R^2} = \frac{c(R_1^2+R_2^2)n - jl - \frac{r^2 l}{R_1^2-R_2^2}}{lr^2(1-j)} \quad \text{(23)}$$

$$R = \sqrt{\frac{lr^2(1-j)}{c(R_1^2+R_2^2)n - jl - \frac{r^2 l}{R_1^2-R_2^2}}} \quad \text{(24)}$$

The equations (19) and (24) give the values of the coordinates $B_x$ and R in terms of the variable speed $n$ and the known constants. They may be transformed to give the values of the coordinates B and R in terms of the variable D and the known constants by making the following substitutions of equivalent values as explained under the derivation of the calibration curve II.

Substituting $ln = D$, $n^2 = D^2 \frac{c_1}{c}$ and $B_x = B + B_0$ in (19) we have:—

$$B + B_0 = \frac{\frac{c_1}{2}(R_1^2+R_2^2)D^2\frac{c_1}{c} - jD + \frac{r^2 m}{R_1^2-R_2^2} - \frac{r^2 D}{R_1^2-R_2^2} + jE}{1-j}$$

$$B = \frac{\frac{c_1}{2}(R_1^2+R_2^2)D^2 - \left(j + \frac{r^2}{R_1^2-R_2^2}\right)D + \frac{r^2 m}{R_1^2-R_2^2} + jE}{1-j} - B_0 \quad \text{(19')}$$

Substituting $n = \frac{D}{l}$ and $c = c_1 l^2$ in (24) we have:—

$$R = \sqrt{\frac{lr^2(1-j)}{c_1 l^2(R_1^2+R_2^2)\frac{D}{l} - jl - \frac{r^2 l}{R_1^2-R_2^2}}}$$

$$R = \sqrt{\frac{r^2(1-j)}{c_1(R_1^2+R_2^2)D - \left(j + \frac{r^2}{R_1^2-R_2^2}\right)}} \quad \text{(24')}$$

The limit value of $n$ (i. e., $n = n_2$ Fig. XVII) for calibration curves I and II is found by setting $k = 0$ in (17).

$$\frac{cn^2}{2}(R_1^2-R_2^2) = \frac{r^2(m-ln)}{R_1^2-R_2^2} = \frac{r^2 m}{R_1^2-R_2^2} - \frac{r^2 ln}{R_1^2-R_2^2}$$

$$\frac{c}{2}(R_1^2-R_2^2)n^2 + \frac{r^2 l}{R_1^2-R_2^2}n = \frac{r^2 m}{R_1^2-R_2^2}$$

$$n^2 + \frac{2r^2 l}{c(R_1^2-R_2^2)^2}n + \left[\frac{r^2 l}{c(R_1^2-R_2^2)^2}\right]^2 = \frac{2r^2 m}{c(R_1^2-R_2^2)^2} + \left[\frac{r^2 l}{c(R_1^2-R_2^2)^2}\right]^2$$

$$= \frac{2r^2 mc(R_1^2-R_2^2)^2 + r^4 l^2}{c^2(R_1^2-R_2^2)^4}$$

$$n + \frac{r^2 l}{c(R_1^2-R_2^2)^2} = \frac{\sqrt{2r^2 mc(R_1^2-R_2^2)^2 + r^4 l^2}}{c(R_1^2-R_2^2)^2}$$

$$\therefore n = n_2 = \frac{r\sqrt{2mc(R_1^2-R_2^2)^2 + r^2 l^2} - r^2 l}{c(R_1^2-R_2^2)^2} \quad \text{(25)}$$

The value of $D_2$ corresponding to $n_2$ is found by substituting $n_2 = \frac{D_2}{l}$ and $c = c_1 l^2$ $$\frac{D_2}{l} = \frac{r\sqrt{2m(c_1 l^2)(R_1^2 - R_2^2)^2 + r^2 l^2} - r^2 l}{c_1 l^2 (R_1^2 - R_2^2)^2}$$

$$= \frac{rl\sqrt{2mc_1(R_1^2 - R_2^2)^2 + r^2} - r^2 l}{c_1 l^2 (R_1^2 - R_2^2)^2}$$

$$D_2 = \frac{r\sqrt{2mc_1(R_1^2 - R_2^2)^2 + r^2} - r^2}{c_1(R_1^2 - R_2^2)^2} \quad (26)$$

*Derivation of formulæ for initial speeds.*
*(Speed from 0 to $n_1$.)*

In this case the confining walls of the discharge chamber are the inner and outer cylindrical surfaces of radii $R_2$ and $R_1$, and the confining wall of the central chamber is the cylindrical surface of radius $R_0$; all of said radii being of arbitrary values. The scale spacing is not uniform. The object of the calculations is to find the value of D in terms of $n$ and the known constants in order that the scale spacing corresponding to this range of speed can be determined. Referring to Fig. XX the calculations for the value of $B_x$ are the same as given under the derivation of calibration curve I, with the exception that D is substituted for $ln$. So that; from (19)

$$B_x(1-j) = \frac{c}{2}(R_1^2 + R_2^2)n^2 - jD + \frac{r^2(m-D)}{R_1^2 - R_2^2} + jE \quad (27)$$

But $$B_x = B_0 + p + cn^2 R_0^2 \quad (28)$$

To find the value of $p$:—The volume swept through by the index surface is equal to the volume swept through by the contact surface. Hence—

$$V jbdtj + V tdet = \pi r^2 D$$

$$\pi R_0^2 p + \frac{\pi}{2} cn^2 R_0^4 = \pi r^2 D$$

$$p = \frac{r^2}{R_0^2}D - \frac{cn^2}{2}R_0^2 \quad (29)$$

$$\therefore B_x = B_0 + \frac{r^2}{R_0^2}D + \frac{cn^2}{2}R_0^2 \quad (30)$$

Substituting (30) in (27) and solving for D, we have:—

$$D = \frac{\frac{c}{2}[(R_1^2 + R_2^2) - R_0^2(1-j)]}{\frac{r^2(1-j)}{R_0^2} + j + \frac{r^2}{R_1^2 - R_2^2}} n^2 + \frac{\frac{r^2 m}{R_1^2 - R_2^2} - B_0(1-j) + jE}{\frac{r^2(1-j)}{R_0^2} + j + \frac{r^2}{R_1^2 - R_2^2}} \quad (31)$$

or $D = K_1 n^2 + K_2$ where $K_1$ and $K_2$ are constants.

From the above the following general formulæ may be considered as the basis for determining the characteristics of the derived face of the axial chamber in the instrument shown in Figs. IV and V. The formulae which may be employed in one form of the embodiment herein disclosed are as indicated below. In these $$c_1 = .0000142 \frac{N^2}{L^2} = c\frac{N^2}{L^2} = \frac{c}{l^2}, \text{ where } l = \frac{L}{N};$$

$N = $ R. P. M. corresponding to L in Fig. V;

$j = \dfrac{\text{specific gravity of lighter liquid}}{\text{specific gravity of heavier liquid}}$ $m = $ length of plunger stroke.

When D is equal to or less than—

$$r\frac{\sqrt{2mc_1(R_1^2 - R_2^2)^2 + r^2} - r^2}{c_1(R_1^2 - R_2^2)^2}$$

$$B = \frac{\frac{c_1}{2}(R_1^2 + R_2^2)D^2 - \left(j + \frac{r^2}{R_1^2 - R_2^2}\right)D + \frac{r^2 m}{R_1^2 - R_2^2} + jE}{1 - j} - B_0$$

$$R = \sqrt{\frac{r^2(1-j)}{c_1(R_1^2 + R_2^2)D - \left(j + \frac{r^2}{R_1^2 - R_2^2}\right)}}$$

When D value is equal to or greater than—

$$r\frac{\sqrt{2c_1(R_1^2 - R_2^2)^2 m + r^2} - r^2}{c_1(R_1^2 - R_2^2)^2}$$

$$B = \frac{c_1 R_2^2 D^2 - jD + rD\sqrt{2c_1}\sqrt{m-D} + jE}{1-j} - B_0$$

$$R = \sqrt{\frac{r^2(1-j)}{2c_1 R_2^2 D + r\sqrt{2c_1}\left(\frac{2m-3D}{2\sqrt{m-D}}\right) - j}}$$

The reason for the particular shape of the derived face of the axial chamber will be readily understood from the above. In the lowest speed range the positions of equilibrium of the liquid mass locate its free surfaces at such points as to require the larger area in order to accommodate the increment of indicating fluid which passes out of tube 12 in order to bring the indicating surface of the fluid to the desired point on the indicating scale.

The movement of the liquid mass, in presence of the speed increment added, creates a space above the free surface of the axial chamber, and this space is such as to receive the required amount of the indicating fluid. As the vertex of the vortex moves downward with increased increments of speed, the space required to receive the additional increments of indicating fluid is equal for equal increments of speed, since the amount of fluid taken from tube 12 is equal for equal increments of speed; it will therefore be understood that the additional volume within the axial chamber is equal to the volume of the increment of indicating fluid to be added.

The space for this volume, must, of course, be provided by the movement of the liquid mass increment into the receiving chamber, and this volume will be a determining factor in shaping the confining walls for the free surface of the inner chamber in accordance with the above rules. It may be noted that, as indicated in the drawings, the various formulæ are employed for each point where it is desired to determine the radius R and the distance B.

This will be readily understood by comparing Figures XVII to XX; for instance, with the indications as in Fig. 4, it may be desirable to apply these formulæ for each of the general points indicated; in this way the values of R and B at the times when the indicating surface is responsive to the indications may be obtained; the position of the vertex will be such as to insure the corelation between the indicating surface and the indications. Under these conditions, it will be readily understood that the positions of equilibrium of the liquid mass are not necessarily those which would be set up under the action of structures such as shown for instance in Figures XIII and XIV, the action of centrifugal forces then producing the natural positions of equilibrium; on the contrary, the positions of equilibrium of the mass are definitely fixed to produce certain values, thus setting up conditions of what may be termed forced positions of equilibrium.

From the above description, it will be understood that I have produced a speed indicator wherein a confined liquid mass— the mass of heavier liquid—is subjected to centrifugal action to produce characteristics of a vortex, wherein the carrier for the mass is formed with connected chambers to receive the mass and to provide a plurality of spaced-apart free surfaces of the liquid mass in permanent connection through the body of the mass, and wherein the indications are made responsive to the changes in position of one of such free surfaces, and in which means are provided in such form as to be operative to establish definite positions of equilibrium of the mass at definite speeds of rotation in presence of mass-increment flow produced by variations in speed, such means including a carrier face— in the form of a compensating face or faces—having a cross-sectional contour such as to cause the volumetric displacement represented by the movement of one of the free surfaces in moving from one position of mass equilibrium to another to be of predetermined and definite value for equal increments of speed, these values being preferably equal; also, that such face is active to compensate for mass-increment flow requirement in establishing the position of mass equilibrium required to place the indicating free surface—the free surface of the heavier liquid in the axial chamber (the surface of contact of the two liquids)—in position to produce indication of the particular speed being measured; and that the face is positioned to be traversed by a free surface of the mass.

Having described my invention, I claim as new:—

1. A speed indicator comprising a rotatable receptacle having a central chamber, a non-central chamber and suitable passages connecting said chambers, a liquid contained in said receptacle, and a vacuum space of known definite volume in said non-central chamber when the receptacle is not rotating.

2. A speed indicator comprising a rotatable receptacle having an axial chamber varying in cross sectional area vertically, an annular chamber concentric with the axis, suitable passages connecting said chambers, an axial transparent tube located above the axial chamber and in liquid communication with it, said tube containing a column of lighter liquid supported upon heavier liquid contained in said chambers and passages, and a vacuum space of known definite volume in said annular chamber when the receptacle is not rotating.

3. A speed indicator comprising a rotatable receptacle having an axial chamber varying in cross sectional area vertically, an annular chamber concentric with the axis, suitable passages connecting said chambers, an axial transparent tube located above the axial chamber and in liquid communication with it, said tube containing a column of lighter liquid supported upon heavier liquid contained in said chambers and passages, and a variable vacuum space in said annular chamber, said vacuum space having known definite volumes corresponding to different speeds of rotation of the receptacle and due to the combined action of centrifugal force and gravity of the liquids.

4. A speed indicator comprising a rotatable receptacle having a non-central chamber, an axial transparent tube and passages establishing a liquid communication between said chamber and tube, said tube containing a liquid, said chamber and passages containing a heavier liquid, a clearance space in said non-central chamber, and means for making said clearance space of known definite volume, said means comprising a member adapted to fit air tight within said tube and adapted further to be moved longitudinally through the tube a definite distance.

5. A speed indicator comprising a rotatable receptacle having a non-central chamber, an axial transparent tube and passages establishing a liquid communication between said chamber and tube, said tube containing a liquid, said chamber and passages containing a heavier liquid, a vacuum space in said non-central chamber, and means for making said vacuum space of known definite volume, said means comprising a member adapted to fit air tight within said tube and adapted further to be moved longitudinally through the tube a definite distance.

6. A speed indicator comprising a rotatable receptacle having an axial chamber decreasing gradually in cross sectional area from top to bottom, an annular chamber concentric with the axis, suitable passages connecting said chambers, an axial transparent tube located above the axial chamber and in liquid communication with it, said tube containing a column of lighter liquid supported upon heavier liquid contained in said chambers and passages, said annular chamber having a vacuum space, and means for making said vacuum space of known definite volume, said means comprising a member adapted to fit air tight within said transparent tube and adapted further to be moved longitudinally through the tube a definite distance.

7. A speed indicator comprising a rotatable receptacle containing two liquids of different specific gravities, a valve mechanism adapted to close and remain closed when the receptacle is inverted thereby preventing the heavier liquid from displacing the lighter liquid, and adapted to open and remain open when the receptacle is upright and revolving thereby permitting the lighter liquid to pass through the valve in either direction.

8. A speed indicator comprising a rotatable receptacle having an axial chamber containing a liquid, an axial tube located above and in liquid communication with said axial chamber and containing a lighter liquid, a valve mechanism adapted to close and remain closed when the receptacle is inverted, thereby preventing the heavier liquid from displacing the lighter liquid in the tube, and adapted to open and remain open when the receptacle is upright and revolving thereby allowing the lighter liquid to pass freely through the valve in either direction.

9. In speed indicators, wherein a confined liquid mass is subjected to centrifugal action to produce characteristics of a vortex, wherein the carrier for the mass is formed with connected chambers to receive the mass and to provide a plurality of spaced-apart free liquid surfaces of and in permanent connection through the body of the mass, and wherein the indications are made responsive to the changes in position of one of such free surfaces, means operative to establish definite positions of equilibrium of the mass at definite speeds of rotation in presence of mass-increment flow produced by variations in speed, said means including a carrier face having a cross-sectional contour of mathematically-derived charactertistic such as to cause the volumetric displacement represented by the movement of one of the free surfaces of the liquid mass in moving from one position of mass equilibrium to another to be equal for equal increments of speed.

10. In speed indicators, wherein a confined liquid mass is subjected to centrifugal action to produce characteristics of a vortex, wherein the carrier for the mass is formed to provide inner and outer chambers in permanent communication and with each chamber having a free surface of the mass with the free surfaces in permanent communication through the body of the mass, and wherein the indications are made responsive to the changes in position of the free surface of the mass of the inner chamber, means operative to establish definite positions of equilibrium of the mass at definite speeds of rotation in presence of mass increment flow produced by variations in speed, said means including a carrier face having a cross-sectional contour of mathematically-derived characteristic such as to cause the volumetric displacement represented by the movement of the free surface of the outer chamber in moving from one position of mass equilibrium to another to be equal for equal increments of speed.

11. In speed indicators, wherein a confined liquid mass is subjected to centrifugal action to produce characteristics of a vortex, wherein the carrier for the mass is formed with connected chambers to receive the mass and to provide a plurality of spaced-apart free liquid surfaces of and in permanent connection through the body of the mass, and wherein the indications are made responsive to the changes in position of one of such free surfaces, means operative to establish definite positions of equilibrium of the mass at definite speeds of rotation in presence of mass-increment flow produced by variations in speed, said means including a carrier face having a cross-sectional contour of mathematically-derived characteristic such as to cause the volumetric displacement represented by the movement of the free surface of the liquid within the receiving chamber in moving from one position to another to be equal for equal increments of speed.

12. In speed indicators, wherein a confined liquid mass is subjected to centrifugal action to produce characteristics of a vortex, wherein the carrier for the mass is formed with connected chambers to receive the mass and to provide a plurality of spaced-apart free liquid surfaces of and in permanent connection through the body of the mass, and wherein the indications are made responsive to the changes in position of one of such free surfaces, means operative to produce distance increments of movement of predetermined amounts of such indicating free surface in presence of speed change increments of equal amounts by establishing definite positions of equilibrium of the mass at definite speeds of rotation, said means including a carrier face traversed by one of said free surfaces of the mass, said face having a cross-sectional contour of mathematically-derived characteristic such as to compensate for mass-increment flow requirements in establishing the position of mass equilibrium required to place the indicating free surface in position to produce indication of the particular speed being measured.

13. A speed indicator as in claim 10 characterized in that the carrier face having the specific cross-sectional contour forms a wall of the inner chamber.

14. A speed indicator as in claim 9 characterized in that the free surfaces of the liquid mass are carried in different chambers of the carrier with the carrier face of specific contour operative to compensate for mass increment flow requirements in establishing the positions of mass equilibrium.

15. In speed indicators, wherein a confined liquid mass is subjected to centrifugal action to produce characteristics of a paraboloid in which the position of the vertex is variable in response to speed changes, and wherein the indications are responsive to the position changes of the vertex, a container for the liquid, said container being mounted to produce paraboloidal characteristics to the confined liquid, said container having communicating chambers for the liquid, said chambers being formed and positioned to provide two free liquid surfaces of the mass permanently connected by the body of the mass with the surfaces spaced-apart and with one of the surfaces movable in correspondence with the vertex movement, said surfaces being variable in position through flow of the liquid responsive to speed changes, variation in position of the surfaces being such as to place them in definite relation to the lines of the changed paraboloidal conformation produced by the change in speed, said container including a derived face active in controlling the amount of the liquid increment shifted in producing the surface variations, said face having a cross-sectional contour such as to cause travel of the vertex of predetermined length in presence of a speed change increment of definite amount, the length of vertex travel for successive speed increments being of predetermined amounts for equal speed increments.

16. A speed indicator as in claim 9 characterized in that the indications are provided by a liquid column of lower specific gravity than that of the liquid mass, the indicating free surface of the mass and the liquid indicator being in contact throughout the mass free surface during periods of rotation of the carrier.

17. A speed indicator as in claim 15 characterized in that the controlling face forms a wall traversed by the free liquid surface which moves in correspondence with the vertex.

18. A speed indicator as in claim 15 characterized in that the indications are provided by a liquid column of lower specific gravity than that of the liquid mass, said column resting upon and being movable with the free liquid surface which moves in correspondence with the vertex during rotation of the container.

In testimony whereof I affix my signature.

EMERY J. WILSON.